June 6, 1939.  J. N. SHUEY  2,161,099
HOLDING VALVE
Filed Feb. 4, 1938  2 Sheets-Sheet 1
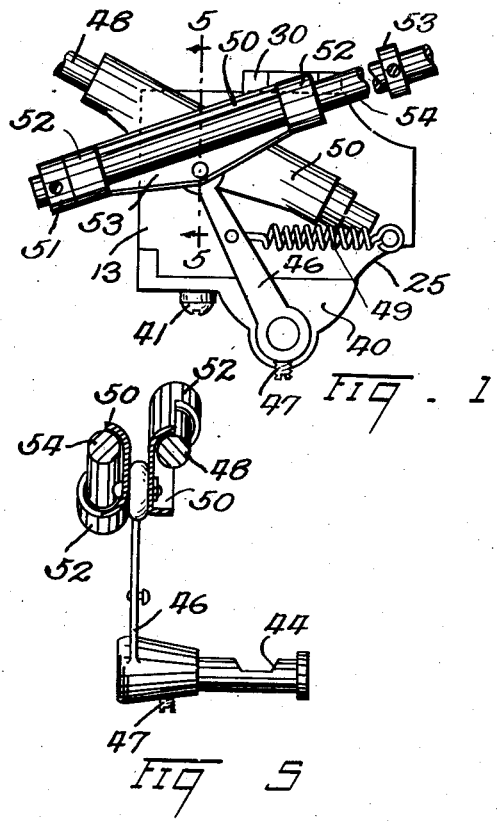
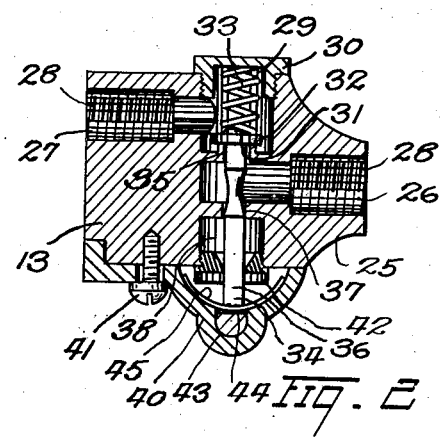
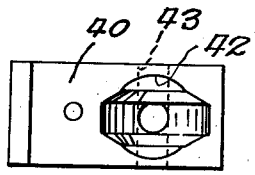
Inventor
James N. Shuey
By E. E. Sauge
Attorney

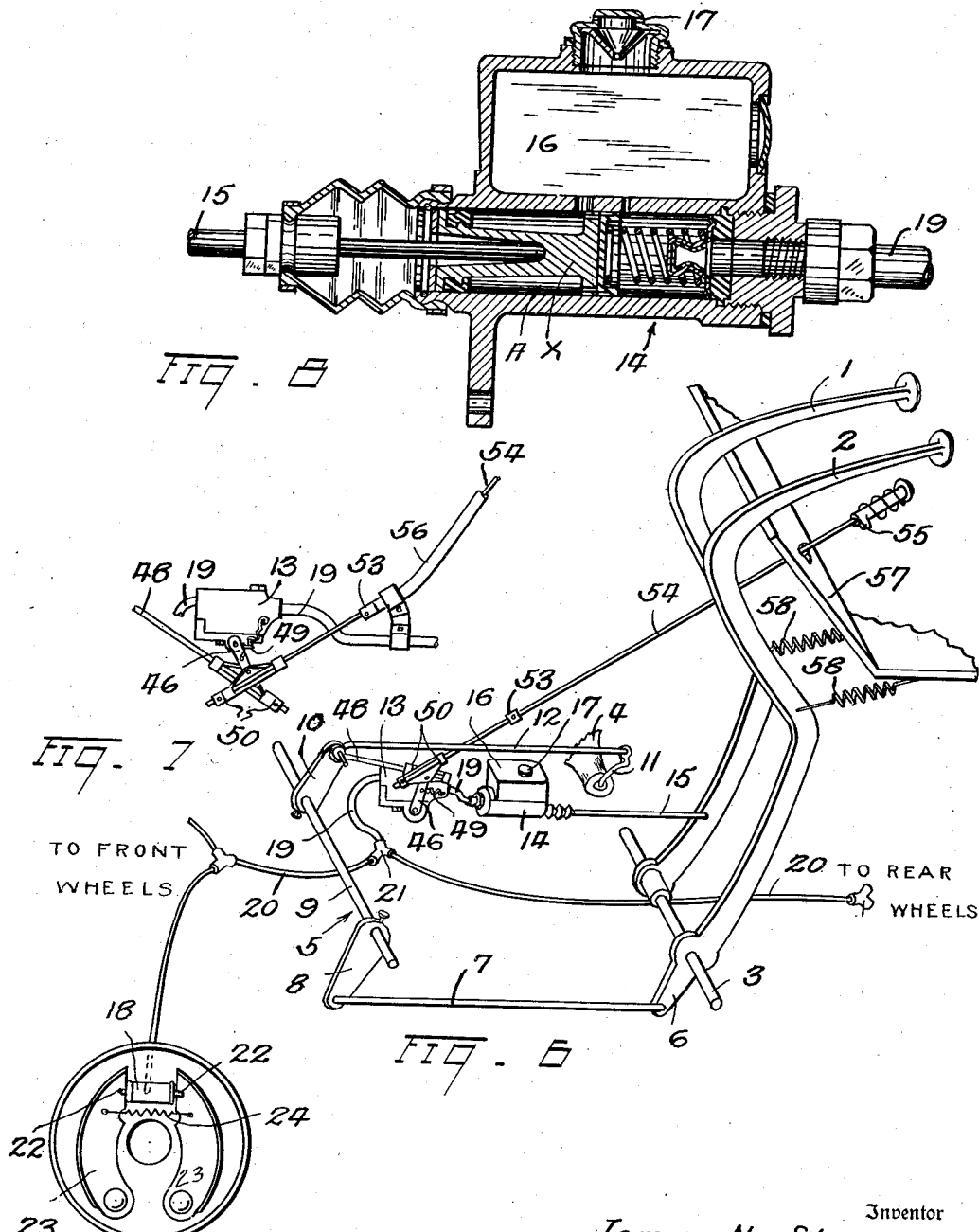

Patented June 6, 1939

2,161,099

UNITED STATES PATENT OFFICE 2,161,099

HOLDING VALVE

James N. Shuey, Everett, Wash.

Application February 4, 1938, Serial No. 188,698

2 Claims. (Cl. 192—13)

This invention relates to valves, more particularly adapted for use in hydraulic braking mechanisms.

One of the objects of the invention is to provide a valve through which pressure in the brake cylinder may be maintained, increased or resumed as required to control the braking actions.

Another object of the invention is to provide a valve whose action is positive, in other words does not depend on gravity for the action of any of its component parts.

A further object of the invention is to provide a valve that will produce a braking action either on level ground, or an upgrade or a downgrade.

A further object of the invention is to provide a valve, controllable by the clutch lever of a car, or through the link mechanism thereof, that will in no manner affect the normal operation of the clutch, and that by its light weight may be connected in the pipe line where convenient for assembling, or directly to the master cylinder of the brake mechanism.

A further object of the invention is to provide a valve that will operate with greater ease and safety in parking or getting away from curbs on hills, that does not depend on gravity for its operation, that is low in cost, quick to install, and that requires relatively no up-keep expense.

A further object of the invention is to provide a valve that is adapted to operate in any position whether vertical, horizontal, or any intermediate position thereby providing a "universal valve".

A further object of the invention is to provide a valve that may be locked as an emergency brake.

With these and other objects in view reference is now had to the accompanying drawings in which:

Fig. 1 is a side elevation of the valve;

Fig. 2 is a vertical section through said valve;

Fig. 3 is a side elevation of the operating parts of the valve, showing cam supporting cap in section;

Fig. 4 is a plan view of cam supporting cap;

Fig. 5 is a rear view of the cam and cam operating lever, with sliding connecting means therefore shown in section, taken on the line 5—5 of Fig. 1;

Fig. 6 is a perspective view of a typical hydraulic brake assembly;

Fig. 7 shows a modified form of connection; and

Fig. 8 is a sectional elevation of the master cylinder showing chamber thereof.

Having reference to the drawings like numerals refer to like parts throughout the several views and the numeral 1 refers to the yieldingly returnable brake lever of a gas engine, such as are used where braking is essential, and 2 refers to the yieldingly returnable clutch lever thereof, both of which levers being carried by and fulcrumed on a transversely positioned shaft 3 supported according to standard practice (not shown) used in such construction and assembly.

The clutch lever 2 is connected with the clutch 4 (a fragmentary representation only of which is shown), through the link mechanism 5 indicated in assembly in Fig. 6, or other equivalent mechanisms (not shown), where the clutch lever 2 is provided with a depending arm 6 in which a main connecting rod 7 is pivotally mounted, this rod 7 extending forward to engage a second depending arm 8 secured rigidly to a counter shaft 9.

On the opposite end of this counter shaft 9, and directed opposite to the second depending arm 8, is a third arm 10 connected operatively to the clutch operating lever 11 by the clutch connecting rod 12.

Obviously various makers of clutch mechanisms employ various methods to accomplish the same purpose of clutch control and this holding valve 13, which forms the subject matter of this invention, therefore consists primarily of a universal check valve, adapted to operate when installed in any position and for the purpose of connection and installation to various clutch mechanisms, other than shown, as well as that shown in the drawings herewith, and this holding valve 13 will now be explained.

The braking mechanism consists of a master cylinder, as represented at 14, and is connected operatively to the brake lever 1 by a piston rod 15 adapted to operate a piston (not shown) in the cylinder 14, and, according to standard practice well known in the art, the master cylinder 14 is provided with a fluid supply chamber 16 surmounted thereon and containing a vent 17 whereby to permit fluid to enter the cylinder 14, where under pressure by depression of the brake lever, will force the fluid into the brake cylinder 18 and by contra action will release the pressure and permit return of the fluid to the fluid supply chamber 16.

A main fluid line 19 conducts the fluid to the several brake cylinders 18, one only of which is shown, by branch lines 20 connected to the main line by means of Y couplings 21, in the general manner represented in Fig. 6.

By this means pressure is communicated to the fluid in the brake cylinder 18 which in turn forces the piston rods 22 thereof in opposed directions to force the brake shoes 23 outward, or against the brake drums (not shown) of the respective wheels (not shown), all in a manner and as these members are well known in the art.

A brake tension spring, represented as at 24, is secured to the opposed shoes by which the piston rods 22 will be yieldingly returned and thus the fluid of the brake cylinder 18 will be returned to the master cylinder 14 upon the contra or return movement of the brake lever 1.

The holding valve will now be explained and consists of a body portion 25, a passageway for the braking fluid being provided in the body 25 in a manner to provide a directionally aligned inlet 26 and an outlet 27 for the fluid in its passage from the master cylinder 14 to the brake cylinders 18 and these are preferably threaded, as represented at 28, for threaded engagement with the main fluid line.

Also formed in said body portion is a valve chamber 29 positioned perpendicular to said passageway, and intermediate the inlet and outlet and in communication therewith, and to prevent possibility of leakage a screw cap closure 30 is provided as shown for the chamber.

The valve chamber opens directly into the outlet portion of the passageway while the opening into the inlet portion is provided by an aperture around which is formed an annular, hollow, valve seat 31, for a purpose to be presently explained.

Contained in the valve chamber is a yieldingly returnable check valve consisting of a valve disc 32 disposed to register with the hollow, annular valve seat 31, and provided with a spring 33 interposed between said disc and said screw cap closure 30 whereby to normally maintain the check valve in the closed position, and when closed preventing the return flow of the fluid.

By this means there is provided an automatically operable check valve that will operate uniformly whether in a vertical position, a horizontal position, or any intermediate positions, and for this reason the holding valve 13 is termed a universal valve, as it is adaptable for connection in any part of the main fluid line that is convenient to complete assembly in the hydraulic braking mechanism.

Means is provided to open said check valve at substantially each cycle of operation of the holding as will be subsequently explained, and for this purpose a valve lifter 34 is provided which consists of a rod terminating in a head at one end adapted to engage the valve disc from below, while its remaining end is extended to project through the body portion to guide and provide a push rod 36 for the lifter 34.

For the purpose of engaging the disc 32 the head 35 is passed through the said orifice in the valve seat to contact the disc and is guidedly maintained in register with the disc by a guide opening 37 provided in the bottom of the inlet 26, and by a packing chamber 38 disposed in vertically aligned relation to the valve chamber 29 containing packing (not shown) and provided with an adjustably mounted gland 39 adapted to provide a guide at the push rod and of said lifter 34 and to adjust the density of the packing.

By this means the lifter passes through the intake passageway for longitudinal movement therethrough to provide positive action to lift said valve disc from its seat, at a selected moment, or at a pre-selected movement of the clutch lever 2.

Obviously the fluid in the inlet passageway is under pressure induced by the application of the brake lever and as the push rod 36 is subjected to atmospheric pressure only, a certain impulse will be given by the created pressure of the fluid to the lifter to assist the return of said lifter against frictional resistance which might be induced by the said packing.

A cam supporting cap 40 is removably attached to the body portion 25 by means of the cap screw 41 whereby, upon removal of the screw 41 and cap 40, the gland 39 is made accessible for adjustment, for which purpose a recess 42 is provided in the cap 40 for the adjusted position of said gland.

The cap 40 is further provided with a bearing 43 in which is rockably mounted a cam 44, the face of which registers with the exposed end of the push rod 36, through the medium of a plate 45, to positively actuate that member by the rocking movement of said cam, said plate 45 being interposed between said push rod and said cam to prevent wear and to provide smooth action between the cam and the push rod.

To rock said cam 44 a lever arm 46 is adjustably attached to the cam shaft, (in which the cam is preferably formed) by means of a set screw 47, so that the position of the lever arm with respect to the cam may be shifted, for a purpose to be explained.

A valve connecting rod 48 connects this lever arm to any moving part of the clutch linkage, as at 18, adapted to supply the proper movement to said lever arm upon a pre-selected movement of the clutch lever.

Obviously the valve connecting rod 48 may be directly connected to the lever arm whereby movement of that member will follow the movement of said clutch lever, however this direct connection is not shown as it is old in the art and as my preferred form of connection is as shown in the drawings where a spring, represented as at 49, is provided to return the lever arm and for this purpose, and another purpose to be explained, a sliding connection 50 is provided which consists of a plate 51 adapted to pivotally engage the lever arm 46 and terminating in a sleeve 52 at each end wherewith to slidably receive the valve connecting rod 48.

By this arrangement and by the use of stop collars 53 positive movement of the lever arm will take place upon movement of the clutch lever in one direction only, the return movement being yieldingly accomplished by the said spring 49.

This arrangement also permits use of a second sliding connection identically mounted on the lever arm and has an emergency valve connecting rod 54 extended rearward and provided with a latching means, represented as at 55, whereby the lever arm may be moved normally forward and be secured by the latch in the usual manner of such mechanics.

Obviously the emergency connecting rod 54 may consist of a flexible wire, as represented in Fig. 7, where necessary to avoid some other part or member and where the wire is essential it is encased in a sheath 56 according to the usual practice of such assembly.

In use the brake is applied by pressing on the brake lever, which act compresses the fluid in the master cylinder and by the compression forces the fluid into the inlet of the holding valve, through the orifice in the annular valve seat where it lifts the valve disc, and continuing to the brake cylinders where it forces the piston rods of this cylinder in opposite directions to move the shoes outward against the tension of the brake springs, as before explained.

This movement of the piston rods, being connected with the shoes, forces them against the brake drum and thus prevents further rotation of the wheels.

The brakes will remain applied as long as the operating parts of the valve are in the position shown in Fig. 2 as the valve disc is firmly seated thus preventing a return flow of the fluid as a result of the tension of the brake springs, and the consequent release of the brakes.

Fig. 2 shows the position of the cam when the clutch lever is depressed and it is obvious that when the clutch lever is returned to the retracted position, shown in Fig. 6, that the push rod will be raised and will open the check valve permitting the fluid return and the release of the brakes.

Where the lever arm is directly connected to the clutch linkage, and as the effective movement of the lever arm occurs at a pre-selected position of the clutch lever, it is obvious that the yieldingly returnable clutch lever will normally return to the retracted position and consequently, where the car is left standing the brakes will automatically be released, an ill advised condition.

With the sliding connections and with the lever arm spring 49 acting to return the said arm the return movement of this arm is more prompt and the action of the holding valve more sensitive.

And further, with the sliding connection, the lever arm may be advanced regardless of the position of the clutch lever, and when so advanced securement in the advanced position may be maintained by the latching means 55, which may be latched to the toe board 57 or other parts, and when so latched the brakes will remain engaged until the latch is released and the lever arm is returned to its normal position, and the valve disc is raised from its seat.

The pre-selected position of the clutch lever is preferably the position assumed in the last inch of travel forward, more exactly the travel of the clutch lever after the clutch is released, therefore in the running position both brake and clutch levers are retracted and are yieldingly held in that position by the springs, represented as at 58.

In this position, the check valve is open and the fluid is at zero pressure, the formally compressed fluid having expanded and returned to the supply chamber.

On coming to a stop the usual operation is to depress both the clutch and brake levers simultaneously when depression of the brake lever compresses the fluid which forces the brake shoes apart, as above explained, to apply the brakes, and depression of the clutch lever, not effecting movement of the disc until reaching the pre-selected point in its travel, opens the check valve at this point which puts control of the brakes strictly subject to movement of the brake lever.

In the above invention I provide a hydraulic braking means having similar action to the mechanical foot brake and emergency brake in that by use of the sliding connections and the emergency connecting rod 54 the check valve may be permitted to close by advancing the said rod 54 regardless of the position of the clutch lever, and by its latching means the check valve will remain closed until the latch is released, as is the case in the mechanical emergency brake.

Obviously with the check valve in the closed position the pressure may be increased or resumed by movement of the brake lever, the check valve being released to close, preventing the fluid following the action of this lever.

Having thus described my invention I claim:

1. In a holding valve for hydraulic brakes, the combination with the brake and clutch levers of an automobile engine and a hydraulic braking mechanism, of an integral body portion provided with a directionally aligned inlet and outlet passageway, a valve chamber formed in said body, and positioned perpendicular to said passageway, and in communication therewith, and provided with a screw cap closure, a check valve contained in said chamber to normally close communication between said chamber and said passageway, a valve lifter disposed in register with said check valve and provided with an extended end, a packing chamber formed in said body in aligned relation to said valve chamber and provided with an adjustably mounted gland adapted to guide said lifter, a removable cam bearing mounting removably secured to said body portion and adapted to cover said gland, a cam rockably mounted in said bearing mounting in engagement with the extended push rod of said lifter and attached to and operable by the clutch mechanism.

2. In a universal holding valve for hydraulic brakes, the combination with a hydraulic braking mechanism, including a clutch lever, of a body portion, provided with a directionally aligned inlet and outlet, formed in said body portion, a valve chamber formed in said body and communicating with said outlet, and provided with an annular valve seat having an aperture therein communicating with said inlet, a yieldingly returnable valve disc disposed in said chamber for register with said seat, and providing with said seat a universal check valve, a valve disc lifter engageable with said disc and provided with an extended and exposed push rod, a packing chamber adapted to seal and guide said push rod, and provided with an adjustably mounted packing gland, a cam supporting cap removably attached to said body for accessibility of adjustment of said gland, said cap being provided with a cam journal, a cam rockably mounted in said journal for register with the exposed extension of said rod, a lever arm adjustably attached to and adapted to rock said cam, means to connect said arm to and for operation by said clutch lever and a manually operable emergency means adapted to secure the brakes in the applied position.

JAMES N. SHUEY.